United States Patent
Konigs et al.

(10) Patent No.: US 9,587,506 B2
(45) Date of Patent: Mar. 7, 2017

(54) SEGMENT OF AN ABRADABLE RING SEAL FOR A TURBOMACHINE, AND PROCESS FOR THE MANUFACTURE OF SUCH A PIECE

(71) Applicants: Karl-Heinz Konigs, Bondoufle (FR); Gerome Sonois, Montrouge (FR); Philippe Martins, Villemoisson sur Orge (FR)

(72) Inventors: Karl-Heinz Konigs, Bondoufle (FR); Gerome Sonois, Montrouge (FR); Philippe Martins, Villemoisson sur Orge (FR)

(73) Assignee: COMPOSITE INDUSTRIE, Bondoufle (FR)

( * ) Notice: Subject to any disclaimer, the term of this patent is extended or adjusted under 35 U.S.C. 154(b) by 0 days.

(21) Appl. No.: 14/303,231

(22) Filed: Jun. 12, 2014

(65) Prior Publication Data

US 2014/0367921 A1    Dec. 18, 2014

(30) Foreign Application Priority Data

Jun. 13, 2013 (FR) .................... 13 55494

(51) Int. Cl.
*B29C 70/34* (2006.01)
*F01D 11/12* (2006.01)
(Continued)

(52) U.S. Cl.
CPC .......... *F01D 11/125* (2013.01); *B29C 70/342* (2013.01); *B29C 70/86* (2013.01);
(Continued)

(58) Field of Classification Search
CPC ....... B29C 70/30; B29C 70/34; B29C 70/342; B29C 70/42
See application file for complete search history.

(56) References Cited

U.S. PATENT DOCUMENTS

| 3,303,245 A | 2/1967 | Trudeau |
| 3,703,433 A | 11/1972 | Sargent |

(Continued)

FOREIGN PATENT DOCUMENTS

| EP | 2 202 264 | 6/2010 |
| EP | 1674671 | 6/2010 |
| FR | 2339741 | 8/1977 |

OTHER PUBLICATIONS

French Search Report dated Mar. 5, 2014, corresponding to the Foreign Priority Application No. 1355494.
U.S. Appl. No. 14/303,213, filed Jun. 12, 2014.

*Primary Examiner* — Matthew Daniels
(74) *Attorney, Agent, or Firm* — Young & Thompson

(57) ABSTRACT

A segment of an abradable ring seal for a turbomachine, includes: a reinforcing support; a composite fabric including fibers impregnated with polymerized resin, and a track of abradable material. The composite fabric is interposed between the reinforcing support 71 and the track of abradable material and is bonded to the reinforcing support, on the one side, and to the track of abradable material, on the other side. The segment of an abradable ring seal has a resistance to tearing in a direction perpendicular to the interface between the track of abradable material and the composite fabric, on the one hand, and between the composite fabric and the reinforcing support, on the other hand, greater than $5 \cdot 10^6$ newtons per square meter. A process for the manufacture of such a segment is also described.

7 Claims, 4 Drawing Sheets

(51) Int. Cl.
*F01D 25/24* (2006.01)
*B32B 37/18* (2006.01)
*B32B 38/00* (2006.01)
*B29C 70/86* (2006.01)
*B29L 31/00* (2006.01)

(52) U.S. Cl.
CPC .............. *B32B 37/18* (2013.01); *B32B 38/00* (2013.01); *F01D 11/122* (2013.01); *F01D 11/127* (2013.01); *F01D 25/24* (2013.01); *B29L 2031/7504* (2013.01); *B32B 2038/0076* (2013.01); *B32B 2307/50* (2013.01); *F05D 2230/21* (2013.01); *F05D 2230/26* (2013.01); *F05D 2230/50* (2013.01); *F05D 2240/11* (2013.01); *F05D 2300/44* (2013.01); *F05D 2300/603* (2013.01); *F05D 2300/6012* (2013.01); *F05D 2300/614* (2013.01); *Y02T 50/672* (2013.01); *Y10T 156/1002* (2015.01)

(56) References Cited

U.S. PATENT DOCUMENTS

| | | | |
|---|---|---|---|
| 3,843,278 A | 10/1974 | Torell | |
| 3,896,206 A | 7/1975 | Beaver et al. | |
| 4,079,162 A | 3/1978 | Metzger | |
| 4,122,672 A | 10/1978 | Lowrie | |
| 4,295,787 A * | 10/1981 | Lardellier | F01D 11/122 415/173.6 |
| 4,329,308 A | 5/1982 | Langer et al. | |
| 4,534,698 A * | 8/1985 | Tomich | F01D 21/045 415/121.2 |
| 4,548,863 A | 10/1985 | Hicks et al. | |
| 4,668,163 A * | 5/1987 | Kervistin | F01D 11/001 415/115 |
| 5,104,718 A | 4/1992 | Asada et al. | |
| 5,192,185 A * | 3/1993 | Leonard | F01D 11/08 415/170.1 |
| 5,330,595 A | 7/1994 | Held | |
| 5,581,054 A | 12/1996 | Anderson et al. | |
| 5,633,042 A | 5/1997 | Nakamura et al. | |
| 5,662,757 A * | 9/1997 | Langenbrunner | F01D 11/12 156/298 |
| 5,837,739 A | 11/1998 | Nowak et al. | |
| 6,060,124 A | 5/2000 | Ikegawa et al. | |
| 6,699,109 B1 * | 3/2004 | Fox | B24C 3/325 451/38 |
| 6,814,541 B2 * | 11/2004 | Evans | B29C 33/40 415/200 |
| 6,977,060 B1 | 12/2005 | Merrill et al. | |
| 8,491,258 B2 | 7/2013 | Schuster | |
| 8,918,970 B2 * | 12/2014 | Hayse | B29B 11/16 28/140 |
| 2002/0076566 A1 | 6/2002 | Brandys et al. | |
| 2006/0035088 A1 * | 2/2006 | Takano | C08G 59/18 428/413 |
| 2006/0134251 A1 * | 6/2006 | Blanton | B29C 33/48 425/110 |
| 2007/0062022 A1 | 3/2007 | Douglas et al. | |
| 2009/0152764 A1 * | 6/2009 | Xie | B29C 70/086 264/219 |
| 2009/0155044 A1 * | 6/2009 | Xie | B29C 70/086 415/9 |
| 2009/0155065 A1 * | 6/2009 | Xie | F01D 11/122 415/200 |
| 2010/0239848 A1 | 9/2010 | Le Corvec | |
| 2013/0153456 A1 * | 6/2013 | Zhu | B29C 70/08 206/521 |

* cited by examiner

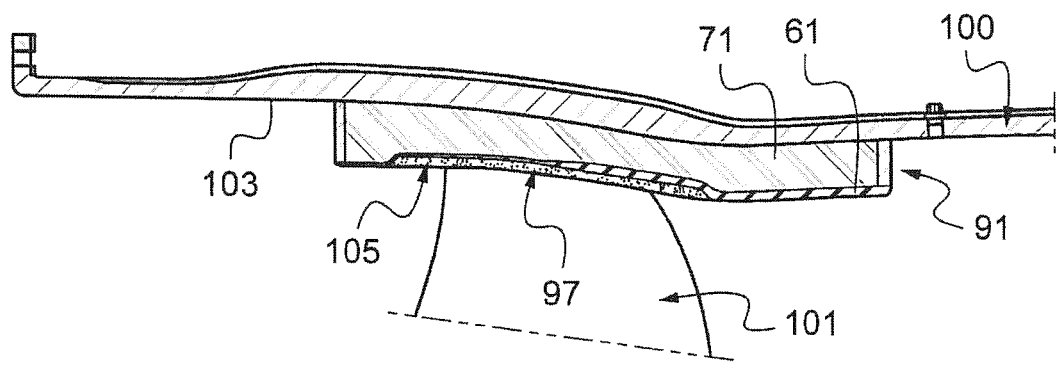
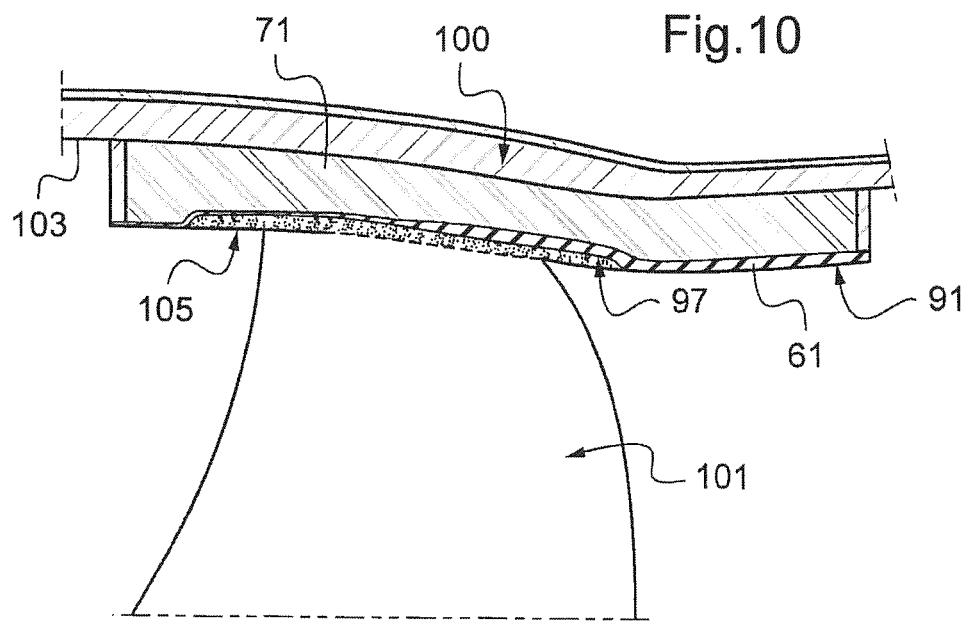

SEGMENT OF AN ABRADABLE RING SEAL FOR A TURBOMACHINE, AND PROCESS FOR THE MANUFACTURE OF SUCH A PIECE

BACKGROUND OF THE INVENTION

The invention relates to a segment of an abradable ring seal for a turbomachine, and in particular for an aircraft engine.

Improving the efficiency of turbomachines, and in particular the efficiency of aircraft engines, is the subject of much research. Among the means used to improve the efficiency, managing the flows of fluid within the turbomachines is of paramount importance. In particular, it is desirable that the annular spacing between a rotor and the corresponding stator is reduced to a minimum. Manufacturing and assembly tolerances, and also phenomena of expansion due to the conditions of temperature and speed during operation, prevent perfect adjustment. The clearance between the ends of the blades, or vanes, of the rotor and the annular inner surface of the stator varies according to the circumstances.

DESCRIPTION OF THE RELATED ART

It is known to coat at least one of the facing surfaces of the rotor-stator assembly with a material chosen specifically to fill the annular space. The coating can be applied to the inside annular surface of the stator or to the radial end of the blades of the rotor. This coating is designed to wear in a controlled manner during operation. This layer of material is thus described by the adjective "abradable", in the sense of "adapted to undergo abrasion".

Within the context of aeronautics, the inside surface of the stator corresponds to part of the inner surface of the engine casing, or shroud, surrounding the fan. The abradable material has a hardness which is lower than that of the material constituting the radial end of the blades and gradually deteriorates in contact with the rotating blades. The partial or total replacement of this abradable material forms part of the usual maintenance operations.

The manufacture/repair of the abradable tracks is largely carried out manually. The material for forming the abradable track is generally in pasty form and is applied by an operator by means of various tools such as a spatula in a dedicated receiver. The receiver has the form of a ring or a cylinder portion formed directly in the radially inside surface of the fan casing or in a support attached to and integral with the casing.

The operator thus applies the material in the pasty state into the annular receiver. This operation is reminiscent of the application of filler carried out by a plasterer in the building sector. This operation is tedious, leads to a high manufacturing cost, long manufacturing/repair times, poor reproducibility, restrictive precautions in respect of the hygiene, health and safety of the operators, and a quality of the products that is difficult to monitor.

After application in the pasty state, the material can be passed beneath a roller in order to press the material against the support.

The pasty material is cured, for example by polymerisation at high temperature and under a controlled pressure. The material then acquires its abradable properties. Finally, inspection and machining of the working surface of the abradable track must be carried out in order to remove imperfections therefrom. Working surface here denotes the free surface of the track that is to be "scraped" by the end of the blades. These operations are also expensive in terms of time and money.

French patent application FR 2 339 741 gives some contextual information relating to abradable seals.

In addition, the maintenance/repair operations involve removing the residual damaged abradable material before new abradable material is applied. Throughout the maintenance/repair operations, the engine and therefore the aircraft are immobilised, or at least the abradable track supports. This is not economically satisfactory.

SUMMARY OF THE INVENTION

The invention will improve the situation.

The applicant proposes a segment of an abradable ring seal for a turbomachine. The segment comprises:

a reinforcing support, a composite fabric including fibres impregnated with polymerised resin, and a track of abradable material.

The composite fabric is interposed between the reinforcing support and the track of abradable material and is bonded to the reinforcing support, on the one side, and to the track of abradable material, on the other side. The segment of an abradable ring seal has a resistance to tearing in a direction perpendicular to the interface between the track of abradable material and the composite fabric, on the one hand, and between the composite fabric and the reinforcing support, on the other hand, greater than $5.10^6$ newtons per square meter.

Such a segment of an abradable ring seal has improved properties, especially in terms of mechanical strength during use. The maintenance and replacement of such segments of an abradable ring seal is easy and rapid. The immobilisation time during the servicing of aircraft equipped with such products is reduced. The risk of the appearance of defects during service is limited.

The segment of an abradable ring seal can have the following features, on their own or in combination:

The reinforcing support comprises a honeycomb structure and has a density of less than 96 kilograms per cubic meter. The support thus has a low mass, reducing the energy consumption of the vehicle provided with such pieces.

The composite fabric comprises a weave which is based on glass fibres or carbon fibres and is impregnated with an epoxy resin. The segment of a ring seal has a low mass while having mechanical properties, especially properties of resistance over time, which confer a long service life upon the segment of a ring seal.

The track of abradable material comprises epoxy resin, at least one crosslinking agent and hollow glass microspheres. Such a composition allows an abradable track of low mass and having a long service life to be obtained.

The epoxy resin comprises at least one of the components from the list comprising bisphenol-A-epichlorhydrin and bisphenol-F-epichlorhydrin. These chemical components have good abradability in the solid state.

The track of abradable material carries a free surface provided with impressions. The aerodynamic behaviour is managed and the efficiency of the turbomachines is increased.

The segment of an abradable ring seal has a bubble or porosity ratio of less than 10%, or even less than 5%. The pieces thus have a low mass, which reduces the energy consumption of the vehicle provided with such elements. The risks of crack propagation and of defects are small.

According to another aspect of the invention there is proposed a process for the manufacture of a segment of an abradable ring seal for a turbomachine. The process comprises the following steps:

a. to arrange a piece of abradable material on at least part of the base of a mold, b. to cover the piece of abradable material and a free part of the base of the mold with a composite fabric, the composite fabric comprising fibres impregnated with thermosetting resin, c. to cover the composite fabric with a reinforcing support, the reinforcing support being placed in the mold, d. to submit the mold to a temperature adapted to cause polymerisation of the thermosetting resin and the mutual adhesion of the piece of abradable material, the composite fabric and the reinforcing support, and

BRIEF DESCRIPTION OF THE DRAWING FIGURES e. to eject a segment of an abradable ring seal for a turbomachine.

The process allows the manufacturing steps to be reduced as compared with former processes. Savings in terms of time and manpower are found. The quantity of material used is reduced. The quality of the elements obtained is improved.

The process can have the following features, on their own or in combination:

An additional step b' is carried out before step b, which consists in preforming the composite fabric on a convex mold. The risk of the appearance of defects in the composite fabric is small. Furthermore, any defects are easy to detect. Any defects can be correctable.

The base of the mold has impressions arranged to form complementary impressions in a surface of the piece of abradable material. An additional and subsequent operation of forming impressions by removing material is avoided.

The present invention will better be understood upon reading the detailed description of some embodiments which are given by way of non-limiting examples and illustrated by the accompanying drawings, in which.

Figure 7:
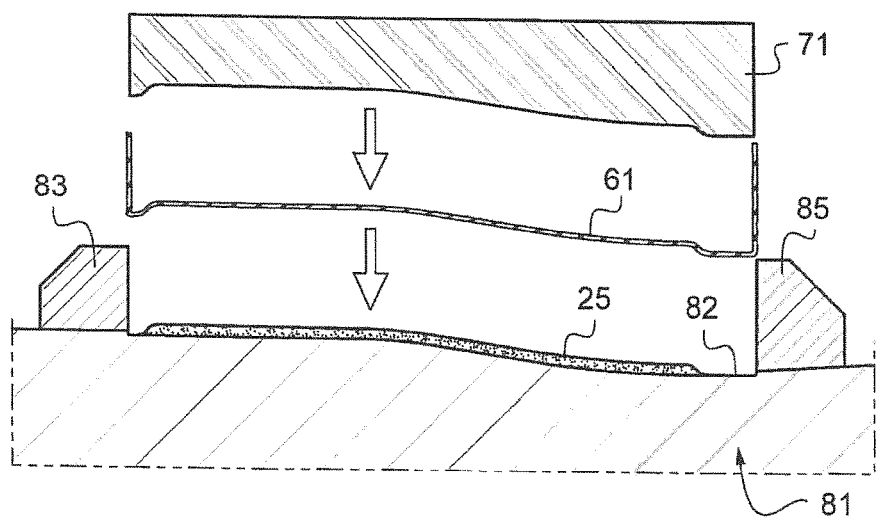
Figure 8:
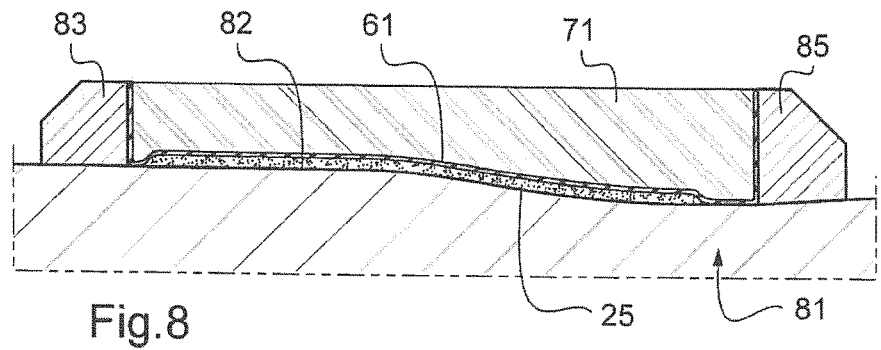
Figure 11:
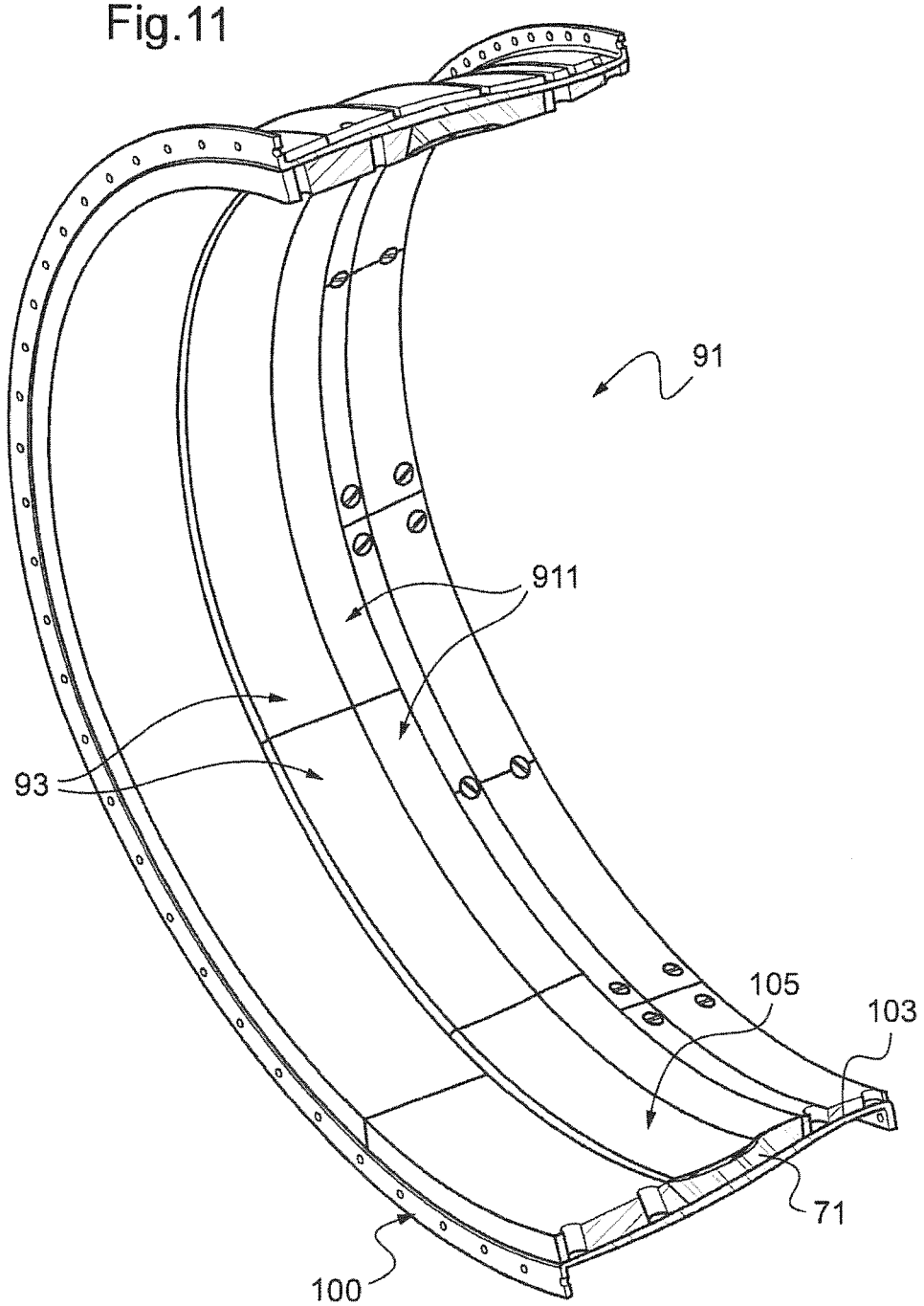

FIG. 7 is a sectional view of a step of the manufacture of a segment of an abradable ring seal for a turbomachine according to the invention, FIG. 8 is a sectional view of a segment of an abradable ring seal for a turbomachine arranged in its manufacturing mold according to the invention, FIG. 9 is a sectional view of a segment of an abradable ring seal located within a turbomachine according to the invention, FIG. 10 is a schematic sectional view of a segment of an abradable ring seal within a turbomachine according to the invention, and FIG. 11 is a partial perspective view of a turbomachine casing carrying segments of an abradable ring seal according to the invention.

DETAILED DESCRIPTION OF THE INVENTION

The accompanying drawings include elements of a specific nature. They may therefore not only serve to complete the invention but also contribute to the definition thereof, where appropriate. It has been found that elements such as the geometry of the pieces described in the following are difficult to define completely other than by means of the drawings. In addition, some forms and dimensions are a function of the intended use of the pieces.

A turbomachine comprises a fan 101 provided with vanes and a corresponding circumferential casing 100. It is here desired to provide the inner annular surface 103 of the casing 100 with an annular track 105 of abradable material to form an abradable ring seal 91. The abradable ring seal 91 is here an assembly of segments 911. The annular track 105 is an assembly of tracks 93 of abradable material each belonging to a segment 911. In order to manufacture the tracks 93, molded pieces 25, or slabs, of abradable material are first manufactured.

Figure 1:
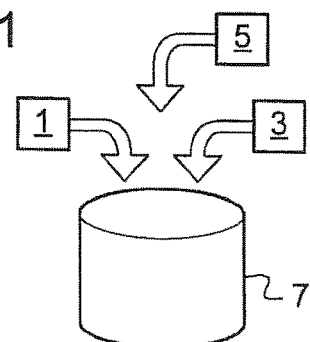
FIGS. 1 and 2 show steps of the manufacture of a piece of abradable material.

Reference will first be made to FIG. 1, which shows schematically the operation of mixing an epoxy resin 1 and a crosslinking agent 3 to manufacture the molded piece 25 of abradable material according to the invention. The epoxy resin 1 and the crosslinking agent 3 are placed in a mixer 7. Depending on the properties that are desired for the final product, other components 5 can be added. There may be mentioned as non-limiting examples the following additive components 5, which are added on their own or in combination:

hollow glass microspheres (CAS no.: 65997-17-3) such as those sold under the references "Scotchlite™ Glass Bubbles" by 3M, so that the density of the mixture is low while the product is protected against the risk of the appearance of cracks or defects, colouring agents, so that the final product is visually identifiable.

In the example described here, a combination of different epoxy resins 1 is used: bisphenol-A-epichlorhydrin (CAS no.: 25068-38-6), bisphenol-F-(epichlorhydrin) (CAS no.: 25064-14-4). The crosslinking agent 3 comprises poly(oxypropylene)diamine (CAS no.: 9046-10-0).

Kits that are ready for mixing are sold under the reference "3M™ Scotch-Weld™ Structural Void Filling Compound 3550 FST B/A, Kit" and "EC-3524 B/A" by 3M. The second reference includes hollow glass microspheres.

The mixer 7 is here an industrial kneader, or spiral mixer, operating at a sufficiently slow speed to limit the risk of damage to the hollow glass microspheres. The mixer model "Aquamix" from VMI can be used, for example. The components are mixed and kneaded until a paste 9 of homogeneous appearance is obtained. The presence of different colouring agents in the components used can facilitate the visual inspection of the homogeneity. The paste 9 obtained has a uniform colour.

Contacting of the polymer base, here the epoxy resin, with the suitable crosslinking agent, curing agent or accelerator causes, if not the initiation, at least the rapid polymerisation of the resin. In the example described here, polymerisation is complete after approximately 48 hours at ambient temperature and under a fume hood. The polymerisation here induces curing and a change from the state of a thixotropic paste to that of a solid. The shaping steps must be carried out before polymerisation is complete and especially before the mixture solidifies and preferably as soon as possible after the mixing operations.

Figure 2:
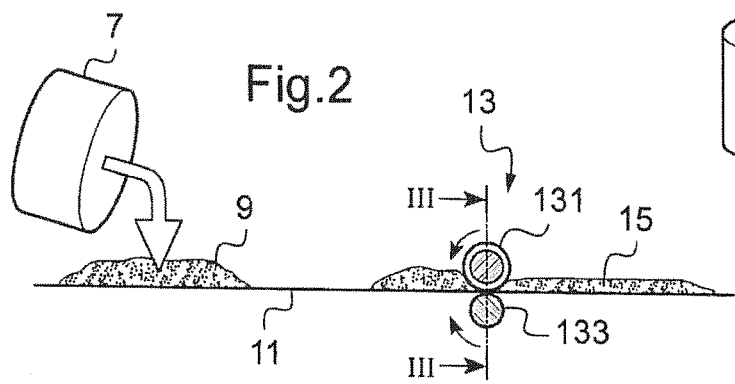
Figure 3:
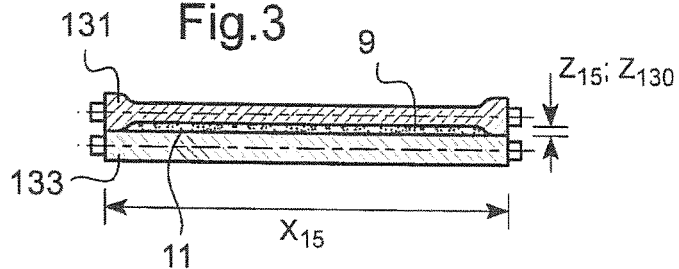
FIG. 3 is a sectional view according to line III-III of FIG. 2.

As is shown in FIG. 2, the paste 9 obtained is deposited from the mixer 7 onto a conveyor belt 11, or web, in order to be conveyed to a rolling mill 13. The rolling mill 13 here comprises an assembly of two rollers 131, 133, which are shown in FIG. 3. The two rollers, an upper roller 131 and a lower roller 133, have axes of rotation which are mutually parallel and perpendicular to the transport direction of the conveyor belt 11. This rolling operation can be called calendering in the sense that the shaping of the paste 9 is started during this step. By way of variation, the rolling mill 13 comprises a single roller or more than two rollers, for example several successive pairs of rollers.

In the example described here, the lower roller 133 has an outside surface which is cylindrical and substantially smooth. The upper roller 131 comprises a central outside surface portion which is cylindrical and of small diameter and which is arranged between two end surface portions which are cylindrical and of large diameter. The central surface portion and each of the end surface portions are connected by a tapered intermediate surface portion. The distance separating the axis of rotation of the upper roller 131 and the axis of rotation of the lower roller 133 is adapted so that each of the cylindrical end surface portions of the upper roller 131 is in contact with the cylindrical outside surface of the lower roller 133. The spacing $Z_{130}$ between the central outside surface portion of the upper roller 131 and the cylindrical outside surface of the lower roller 133 is substantially constant.

During rolling/calendering, the rollers 131, 133 are rotated according to their respective axis of rotation and in opposite directions compatible with the forward movement of the conveyor belt 11, which is from left to right in FIG. 2. On leaving the rolling mill 13, the paste 9 has acquired the shape of a strip of paste 15. The strip of paste 15 has a constant width $X_{15}$. The width $X_{15}$ includes the end portions resulting from the tapered intermediate surface portions of the upper roller 131. The width $X_{15}$ can be from 10 to 100 centimeters, for example 30 centimeters.

By way of variation (not shown), the roller that forms the working surface of the piece 25 of abradable material, here the lower roller 133, has a die surface. The die surface, that is to say the surface provided with impressions, is arranged to form, by means of pressure, complementary impressions in the working surface of the strip of paste 15. The die surface can also be carried by a roller which is separate from that of the rolling mill 13. A surface that is not smooth, with impressions or grooves, allows the efficiency of the abradable ring seal 91 during operation to be improved further.

The strip of paste 15 has a thickness $Z_{15}$ which is substantially constant except for the end portions in the direction of its width. The latter have a bevelled shape resulting from the tapered intermediate surface portions of the upper roller 131. The thickness $Z_{15}$ is substantially equal to the spacing $Z_{130}$. Here, the thickness $Z_{15}$ is from 5 to 15 millimeters, for example 7 millimeters. By way of variation, the thickness $Z_{15}$ can vary over the width of the strip of paste 15, for example from 7 to 11 millimeters. At the outlet of the rolling operation, the strip of paste 15 is produced substantially continuously. Rolling is here carried out at ambient temperature. Rolling is here carried out at a substantially constant speed, for example from 1 to 30 linear meters per minute.

In a subsequent step, which is not shown, the strip of paste 15 is cut into sections 23. The strip of paste 15 is cut to length. The sections 23 have a length $Y_{23}$ which is substantially identical for each section 23. The width $X_{23}$ and the thickness $Z_{23}$ of the section 25 are unchanged relative to those $X_{15}$ and $Z_{15}$ of the strip of paste 15. By way of variation, cutting of the strip of paste 15 into sections 23 is carried out after the rolling operation, for example on the same manufacturing line.

The length $Y_{23}$, the width $X_{23}$ and the thickness $Z_{23}$ of the section 23 correspond substantially to those of the piece 25 of abradable material which is to be produced. These dimensions are adapted to correspond to a receiver 97 provided on the inner surface 103 of a casing 100 of a fan 101 of a turbomachine. The receiver 97 can also be formed in a reinforcing support 71 integral with said casing 100.

Figure 4:
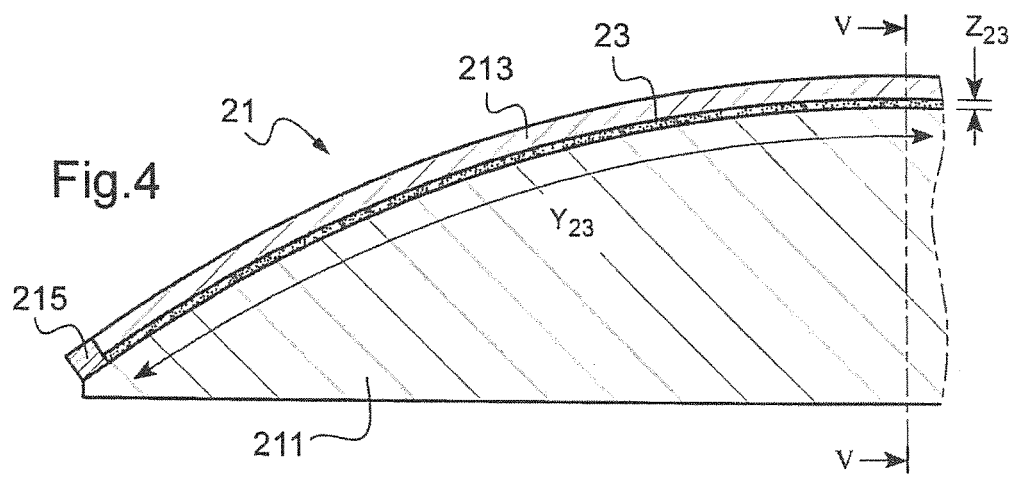
FIG. 4 shows a step of the manufacture of a piece of abradable material.
Figure 5:
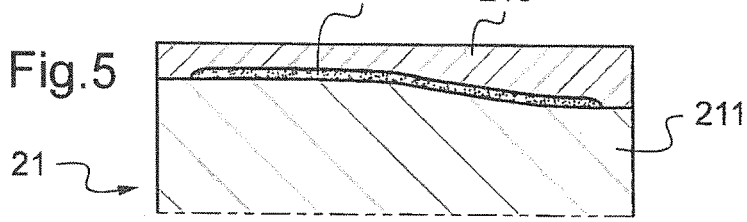
FIG. 5 is a sectional view according to line V-V of FIG. 4.

As is shown in FIG. 4, a section 23 is arranged in a mold 21. In FIG. 4, only half of the assembly is shown, the assembly having a plane of symmetry corresponding to the axis V-V. The mold 21 comprises a base 211 and a cover 213. The mold 21 further comprises wedges 215 which immobilise the section 23 in the mold 21. The base 211, the cover 213 and the wedges 215 are arranged to form, in the assembled and closed state, an inside receiver having the desired final shapes and dimensions of the piece 25 of abradable material. The shape and dimensions correspond substantially to those of the receiver 97 provided on the inner surface 103 of the casing 100 of the fan 101 of a turbomachine. The section 23 of paste is here subjected to temperatures adapted to cause or accelerate the polymerisation of the section 23. The temperature is here approximately from 50 to 80° C., for example 60° C. After a polymerisation time which is adapted according to the composition and dimensions of the section 23, the piece 25 of abradable material in the cured state is ejected. The piece 25 of abradable material is preformed.

The piece 25 of abradable material has the shape of a segment of a ring of width $X_{25}$, of circumferential length $Y_{25}$ and of thickness $Z_{25}$. These dimensions are substantially homogeneous throughout the piece 25. These dimensions are substantially similar to those $X_{23}$, $Y_{23}$ and $Z_{23}$, respectively, of the section 23. The curved shape of the piece 25 is fixed by the curing.

Figure 6:
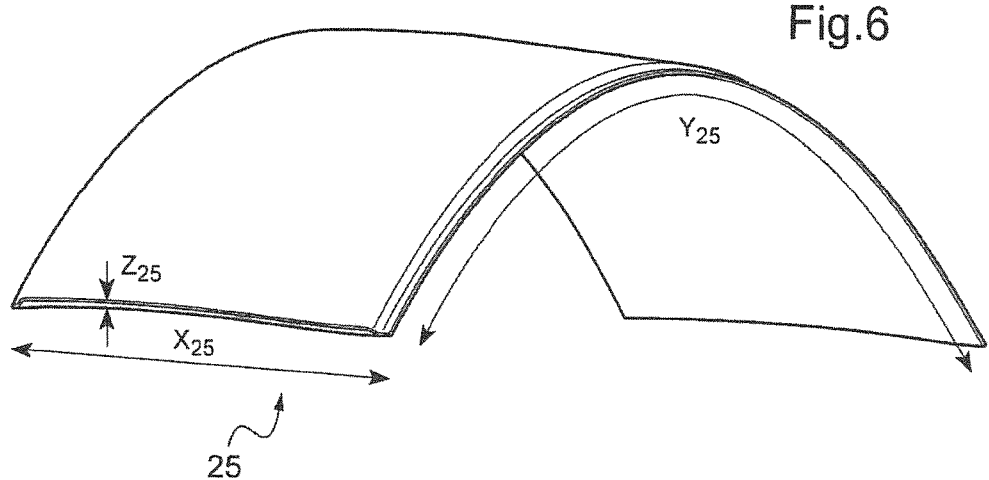
FIG. 6 shows a piece of abradable material.

An example of a piece 25 of abradable material is shown in FIG. 6. The piece 25 of abradable material shown here has the shape of a shell with a single dimension of curvature in the plane perpendicular to the width direction. The piece 25 of abradable material is of substantially constant width $X_{25}$ and thickness $Z_{25}$, with the exception of the thickness of the ends of bevelled shape. The value of the curvature depends on that of the receiver 97 in the casing 100 and on the radial position of the track 93 in the turbomachine. In other words, the curvature depends on the final diameter of the abradable track 105 of the abradable ring seal 91.

The length $Y_{25}$ of the piece 25 of abradable material corresponds to a ring segment of the abradable ring seal 91. In the example described here, five pieces 25 of abradable material, each representing approximately 72° of the complete ring, are necessary to manufacture five segments 911 of the abradable ring seal 91.

In the example described here, the abradable ring seal 91 is produced by means of a combination of five substantially equivalent segments 911, that is to say segments of approximately 72 degrees. The complementary ring segments may or may not be similar. Generally, the production of the abradable ring seal 91 by assembling a plurality of ring segments complies with technical constraints and constraints in terms of manufacturing costs, especially relating to the size of the machines necessary for the different manufacturing steps, the space required for storage, etc.

By way of variation, the abradable ring seal 91 is produced by means of a single annular piece 25 of abradable material (that is to say an element of 360 degrees). The size of the piece 25 of abradable material is suitable for the manufacture of a segment 911 of an abradable ring seal 91 of approximately 360°. In this case, a single 360° segment 911 is sufficient and corresponds to the complete abradable ring seal 91 itself. Production of the ring seal 91 in one piece allows a saving to be made in terms of the operations of assembling the segments 911.

The pieces of abradable material 25 so produced can be stored or subsequently used for the manufacture of an abradable ring seal 91 or for the repair/restoration of such an abradable ring seal 91.

FIG. 7 shows an exploded sectional view according to a plane perpendicular to the length of the piece 25 of abradable material. A mold 81 comprises a base 82 and edges 83, 85. A piece 25 of abradable material is arranged against the bottom 82 of the mold 81. The piece 25 of abradable material can be obtained, for example, by carrying out the process described in relation to FIGS. 1 to 6.

By way of variation, the base 82 of the mold 81 has impressions. The impressions are arranged to form complementary impressions in the surface of the piece 25 of abradable material applied to the base 82. A surface that is not smooth, with impressions or grooves, allows the efficiency of the abradable ring seal 91 during operation to be improved further.

The piece 25 of abradable material and the inside surfaces of the mold 81 which have remained free after the arrangement of the piece 25 of abradable material are covered with a composite fabric 61.

The composite fabric 61 comprises fibres impregnated with thermosetting resin. In the example described here, the fibres are glass fibres. By way of variation, the composite fabric 61 can comprise carbon fibres. The composite fabric 61 here comprises a reinforcing weave called "satin", for example a "5 satin". The designation "satin" means that the weave of the fabric is woven in such a manner that the interlacing points do not touch. The "5" means that the elementary motif of the weave is a square of 5 stitches by 5. By way of variation, the composite fabric 61 comprises a reinforcing weave called "taffeta" or "plain". The designation taffeta or plain means that the weave of the fabric is woven so that each warp yarn passes alternately above and below each weft yarn and vice versa. The mass per unit area of the reinforcing weave can be from 150 to 350 grams per square meter, for example 305 grams per square meter.

The composite fabric 61 is here impregnated with an epoxy resin, for example the epoxy resin sold under the reference "MTM®49L" by CYTEC. The composite fabric 61 is impregnated with an amount by mass of resin of from 30 to 50%, for example 43%.

The term "composite fabric" can here refer to a single ply or to a superposition of plies, which may or may not be similar. The desired thickness is chosen by adapting the polymerisation conditions (pressure and temperature), the number of layers implemented and/or shifts in the superposition generating different thicknesses in a given element.

The presence of resin in the composite fabric 61 confers a so-called "sticky" appearance on said impregnated fabric. In other words, the composite fabric 61 has an appearance that is tacky to the touch. It is valuable to protect said composite fabric 61 by applying a protective film to the surface opposite the piece 25 of abradable material. The use of a protective film makes it possible to avoid, for example, pollution, contamination or any surface damage caused by dust or debris present in the environment. The use of a protective film makes it possible to reduce the space required by the composite fabrics 61 during their storage prior to manufacture, for example by winding them up on themselves or by superposing them prior to the manufacture of the segment 911 of an abradable ring seal 91. The protective film arranged on the outside surface of the composite fabric 61 during its application in the mold 81 facilitates application of the composite fabric 61 to the piece 25 of abradable material and the free surfaces of the mold 81. In particular, the tools and/or the operators' hands are protected from the resin contained in the composite fabric 61. The protective film can be removed after application of the composite fabric 61 in the mold 81.

In the example described here, the composite fabric 61 is precut substantially to its final size. By way of variation, the composite fabric 61 can protrude from the mold 81 and then subsequently be cut.

By way of variation, the composite fabric 61 undergoes preforming in a mold that is separate from the mold 81. For example, this separate mold can have a convex shape, called "positive" or "male". Preforming of the composite fabric 61 on a convex mold facilitates the work of draping by the operator. The composite fabric 61 is partly polymerised on the convex mold in order to give it sufficient strength to be moved. The composite fabric 61 is then moved into the mold 81 without losing its preliminary shape. At this stage, the composite fabric 61 applied to the separate convex mold can be compacted, for example by evacuation. The composite fabric 61 can be heated. There is obtained a preform, or "mat in semi-rigid form". Furthermore, the use of a preformed composite fabric 61 facilitates the operation of insertion into the mold 81, shown in FIG. 7.

A stiffening or reinforcing support 71 is in turn placed in the mold 81 on the composite fabric 61. In other words, a so-called "sandwich" superposition is produced, in which the composite fabric 61 is interposed between the piece 25 of abradable material at the bottom and the reinforcing support 71 at the top.

In the example described here, the reinforcing support 71 is a panel having a honeycomb structure which has mechanical properties that are sufficient to withstand the specific constraints of aircraft engines while having a low mass. For example, panels referenced "Nomex® ⅛-4.0" for cells of ⅛ inch and a mass of 4 pounds per cubic foot or "Nomex® 3.2-64" for cells of 3.2 millimeters and a mass of 64 kilograms per cubic meter are sold by Schutz. These panels have a density less than 96 kilograms per cubic meter, here 64 kilograms per cubic meter. By way of variation, panels having a honeycomb structure based on aluminium can be used.

The mold 81 is closed by a counter-mold and by means of a vacuum bag (not shown). The mold 81 and its contents are subjected to a temperature adapted to cause polymerisation of the resin(s) with which the composite fabric 61 is impregnated. Said resins are fluidified in order to impregnate the reinforcing support 71 on the one side and the piece 25 of abradable material on the other side. Upon solidification, adhesion occurs between the three parts forming the assembly. This step can also be carried out in an autoclave. The autoclave enables a uniform pressure to be applied to elements having complex shapes. The assembly of the above-mentioned three parts is carried out in a common step.

After a polymerisation time adapted as a function of the resins used, the assembly is brought to ambient temperature again. In the example described here, the polymerisation or "co-curing" is carried out for a period of from 60 to 720 minutes, for example approximately 90 minutes. The polymerisation is here carried out at a temperature of approximately 135° C. The assembly comprising the reinforcing support 71, the composite fabric 61 and the piece 25 of abradable material then forms a segment 911 of an abradable ring seal 91. The segment 911 of an abradable ring seal 91 is ejected from the mold 81.

The free surface of the reinforcing support 71, and therefore of the segment 911 of an abradable ring seal 91, is to be applied and fixed to the inner surface of the casing 100 of a turbomachine. The free surface of the reinforcing support 71 is machined and prepared for adhesion to said casing 100.

The segment(s) 911 of an abradable ring seal 91 are fixed to the casing 100 of a turbomachine, for example by adhesive bonding and/or polymerisation. The adhesive used can be, for example, a film of epoxy adhesive. The adhesive referenced "Redux® 322" and sold by Hexcel can be used. Fixing can be carried out in an autoclave. According to one embodiment, the segments 911 of an abradable ring seal 91 are bonded to the casing 100 during a common step in an autoclave.

In the case of an abradable ring seal 91 produced from at least two segments 911, the connection and continuity of the tracks of abradable material 93 of each of the segments 911 is inspected and any imperfections are corrected.

There is then obtained a casing 100 of a turbomachine, the radially inside surface 103 of which carries an assembly comprising, radially from the outside to the inside, a reinforcing support 71, a layer of composite fabric 61 and a substantially continuous and annular track 105 of abradable material resulting from the succession of the tracks of abradable material 93 of the segments 911.

The bubble and porosity ratio is low, for example less than 10% and even less than 5%. The abradable ring seal 91 has improved resistance to tearing at the interface between the abradable track 105 and the reinforcing supports 71 in a radial direction of the turbomachine. The resistance to tearing is here greater than $5.10^6$ newtons per square meter ($500$ $N.cm^{-2}$).

Within the context of maintenance and repair, the worn segments 911 requiring repair or replacement of the abradable track 93 can quickly be exchanged. Accordingly, the turbomachines, and therefore the aircraft, are immobilised only for the time required to remove the worn segment 911 and fix a new or renovated segment 911. The removed segment 911 can subsequently be renovated in the workshop.

The manufacturing process described above allows the uniformity of the abradable annular track 105, its defect ratio (air bubbles, impurities, etc.), its dimensional tolerances and the continuity of the radially inside surface, called the working surface, to be improved as compared with the techniques of the prior art.

The means described above that are employed further allow a considerable degree of automation, leading to improved reproducibility and reduced manufacturing costs and times.

As already indicated, these products and techniques are used principally in the aeronautics field to produce stator-rotor seals of aircraft turbomachines. However, these products and techniques can be used in other fields to produce abradable tracks. It has been found that a stator-rotor seal according to the invention allows performances to be obtained which are at least equal to those of the prior art, with a reduction in the amount of material wasted, a reduction in the contamination of equipment and/or operators' hands, a reduction in manufacturing times and better reproducibility. Unintentional and untimely bonding of the abradable material to other elements during manufacture and repair is limited.

Assembly of the abradable track to the composite fabric and to the reinforcing support in a single step allows an additional and subsequent step of machining of said abradable track to be saved. In addition, the prior and separate manufacture of an element of abradable material allows that element of abradable material to be inspected and any corrective action to be taken before it is integrated into the other components of the turbomachine. Unlike the techniques of the prior art in which an existing supporting element was coated with an abradable paste, the supporting element is manufactured according to the invention around the abradable element, which becomes an abradable track.

The invention claimed is:

1. A process for the manufacture of a segment (911) of an abradable ring seal (91) for a turbomachine, said process comprising the following steps:
   a. to arrange a piece (25) consisting of polymerized abradable material on at least part of the base (82) of a mold (81),
   b. to cover the piece (25) consisting of polymerized abradable material and a free part of the base (82) of the mold (81) with a composite fabric (61), the composite fabric (61) comprising fibres impregnated with thermosetting resin,
   c. to cover the composite fabric (61) with a reinforcing support (71), the reinforcing support (71) being placed in the mold (81),
   d. to submit the mold (81) to a temperature adapted to cause polymerisation of the thermosetting resin and the mutual adhesion of the piece (25) consisting of polymerized abradable material, the composite fabric (61) and the reinforcing support (71), and
   e. to eject, from the mold (81), a segment (911) of an abradable ring seal (91) for a turbomachine.

2. The process according to claim 1, wherein an additional step is carried out before step b:
   a': the composite fabric (61) is preformed on a convex mold.

3. The process according to claim 1, wherein, prior to being arranged in the at least part of the base of the mold, the piece (25) consisting of polymerized abradable material has a curved shape.

4. The process according to claim 3, wherein,
   when ejected from the mold, the segment (911) of the abradable ring seal (91) is comprised of the reinforcing support (71), the composite fabric (61) with the fibres impregnated with the polymerised resin, and a track of abradable material (93) consisting of the polymerized abradable material, the composite fabric (61) being interposed between the reinforcing support (71) and the track of abradable material (93) and being bonded to the reinforcing support (71), on a first side, and to the track of abradable material (93), on an opposite, second other side, and
   the segment (911) of the abradable ring seal (91) having a resistance to tearing in a direction perpendicular to an interface between the track of abradable material (93) and the composite fabric (61), and between the composite fabric (61) and the reinforcing support (71), greater than $5.10^6$ newtons per square meter.

5. The process according to claim 1, wherein, prior to being arranged in the at least part of the base of the mold, the piece (25) consisting of polymerized abradable material has a curved shape and dimensions adapted to correspond to a receiver (97) provided for use in an inner surface (103) of a casing (100) of a fan (101) of a turbomachine.

6. The process according to claim 1, wherein, after step d., the reinforcing support (71) has a honeycomb structure and a density of less than 96 kilograms per cubic meter.

7. The process according to claim 1, wherein, the composite fabric (61) used in step b., comprises a weave based on glass fibres or carbon fibres and the thermosetting resin is an epoxy resin.

\* \* \* \* \*